Feb. 4, 1941.   L. E. BAYNES   2,230,370
AIRCRAFT
Filed Feb. 26, 1938   2 Sheets-Sheet 1
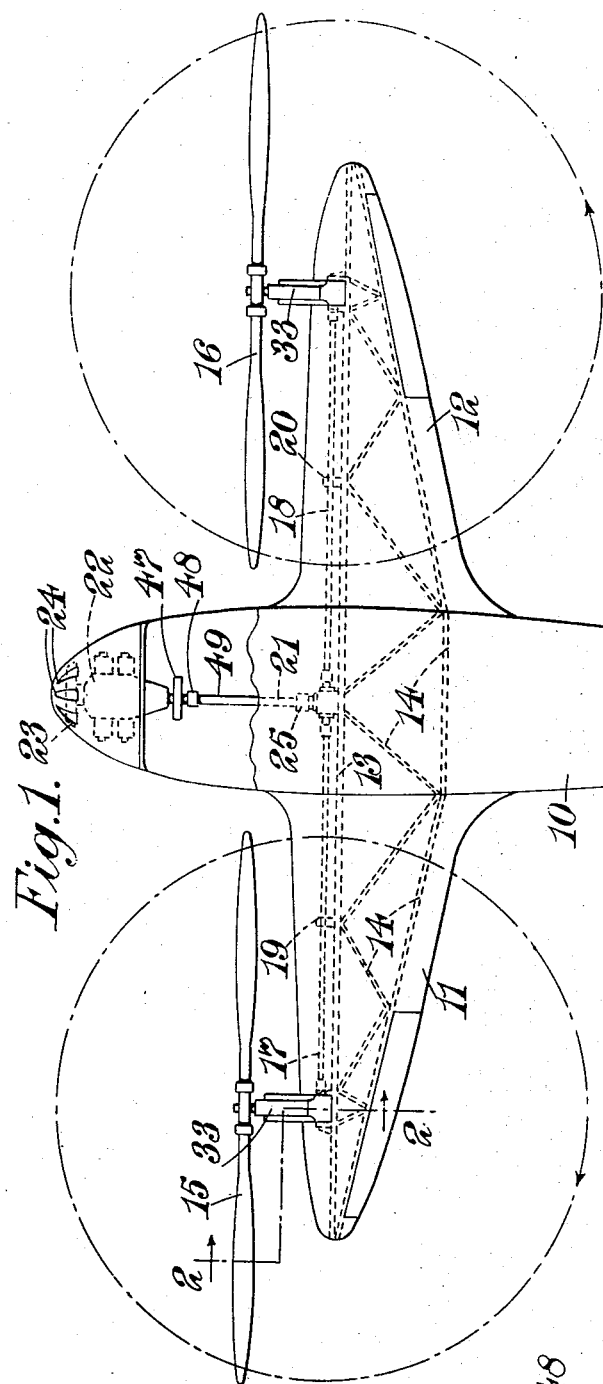
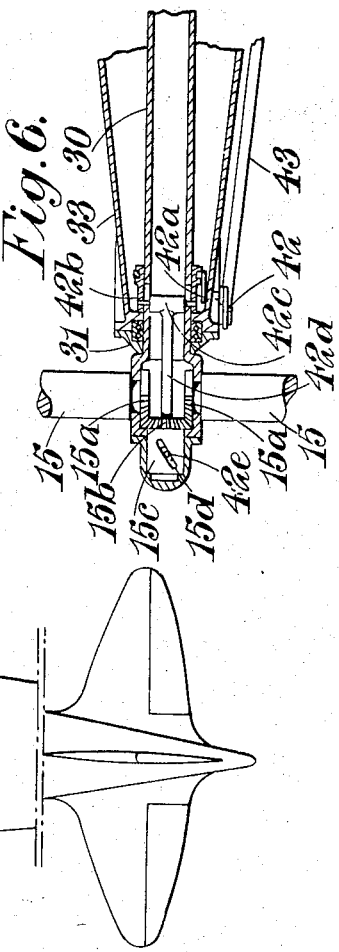
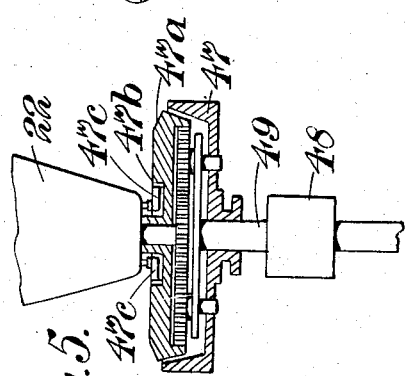
Leslie Everett Baynes
by his attys.
Stebbins and Blenko

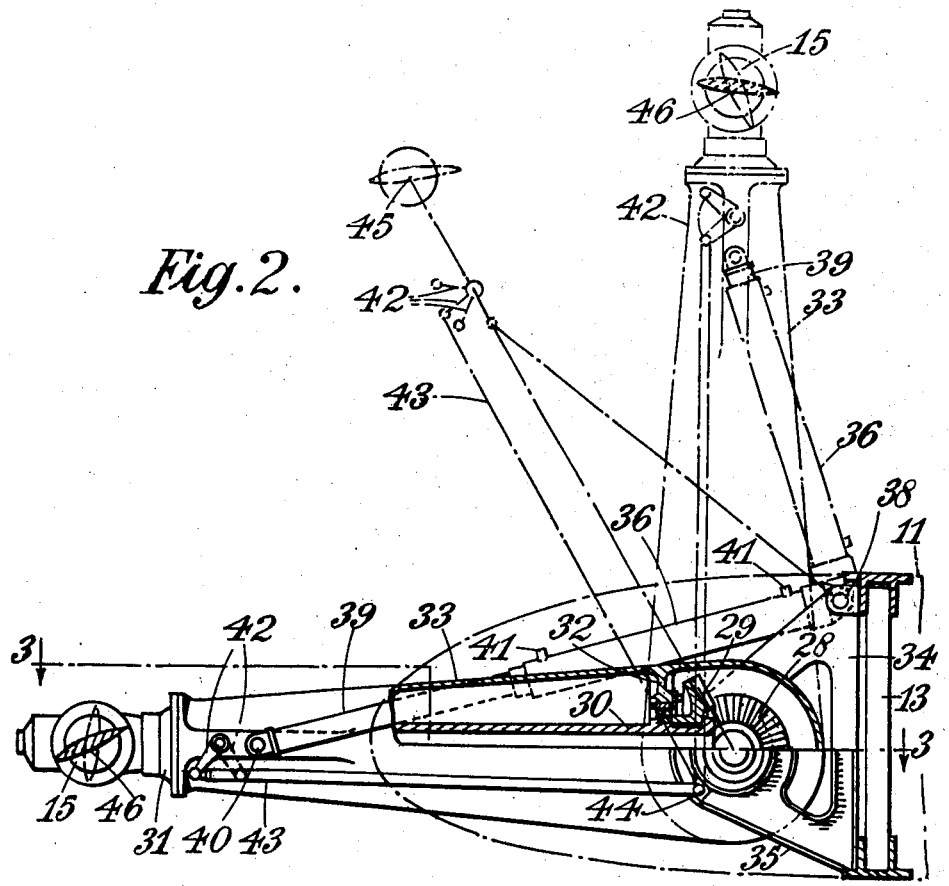
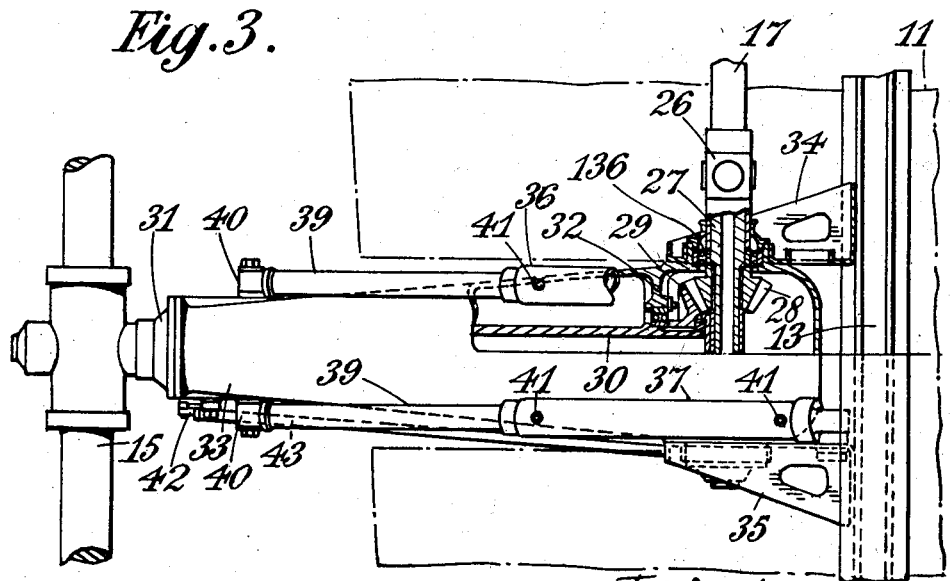

Patented Feb. 4, 1941

2,230,370

UNITED STATES PATENT OFFICE 2,230,370

AIRCRAFT

Leslie Everett Baynes, Bourne End, England, assignor to Alan Muntz & Company Limited, Hounslow, Middlesex, England Application February 26, 1938, Serial No. 192,870
In Great Britain March 4, 1937

16 Claims. (Cl. 244—56)

The present invention comprises improvements in or relating to aircraft and has for object the provision of a craft which has to some extent the advantages when in flight of a fixed wing type of craft and also the advantages when taking-off or landing of a rotating-wing type of craft.

In the fixed wing type of aircraft it is necessary to provide wings of a larger area than that necessary for sustaining the aircraft during level flight at normal or high speeds, in order to secure slow landing and take-off speeds for which it is necessary for the aircraft to be supported with a relatively small loading of the wing surface. If level flight of the aircraft at normal cruising or high speeds only were to be considered it would be possible to employ a wing surface about one quarter (or even less) of that at present necessary since the loading of the wing could correspond to that of least resistance at maximum flying speed. With such a reduction in the wing surface and the consequent reduction in the size of the remainder of the aircraft structure very much greater maximum speeds could be obtained. At present a compromise between the requirements of slow landing and take-off speeds and of maximum flying speed is made.

In aircraft having a rotating wing, however, a very slow landing speed is achieved and the craft may in fact be landed almost vertically without possibility of stalling. Such aircraft, however, are much slower in horizontal flight than the fixed wing type of craft.

According to the present invention there is provided an aircraft comprising a fixed aerofoil surface to support the craft in horizontal flight at maximum speed, a pair of rotors which are disposed one on each side of the fore-and-aft plane of symmetry of the craft and are mounted for bodily adjustment relatively to the craft into alternative positions at which vertical lift and forward horizontal movement of the latter are aided by the rotors to a greater or less extent, and means to transmit an engine drive to the rotors at any one of said alternative positions, and which aircraft comprises also means automatically to effect adjustment of the pitch of the rotor blades during adjustment of the position of the rotors relatively to the craft.

Preferably each rotor is mounted for the bodily adjustment of its axis of rotation in a plane substantially parallel to the fore-and-aft plane of symmetry of the craft about an axis transverse and substantially perpendicular to the said planes and between limiting positions of adjustment which have an angular separation of approximately one right angle and at which the effect of the rotor is substantially to produce vertical lift or forward horizontal movement of the craft alone respectively.

It will be seen that the present invention enables a wing loading for the fixed wings to be chosen such that they operate at an incidence substantially corresponding to the minimum resistance or maximum value of the L/D ratio.

Numerous important features and advantages of the invention will become apparent from the following description of aircraft constructed in accordance with the invention, which description is given by way of example in order that the invention may be more clearly understood and refers to the accompanying drawings in which:

Figure 1 is a plan view of an aircraft with twin rotors in position for horizontal flight of the craft;

Figure 2 is a sectional view on the line 2—2 of Figure 1 looking in the direction of the arrows and drawn to a larger scale, and Figure 3 is a sectional view on the line 3—3 of Figure 2 looking in the direction of the arrows.

Figure 4 is a detailed section of the part 48.

Figure 5 is a detail on an enlarged scale showing the interior of the gear mechanism 47.

Figure 6 is a detail of the internal construction of the mechanism for varying the pitch of the rotor blades.

Like reference numerals are employed in the several figures of the drawings to denote like parts.

The craft shown in Figure 1 has a stream-lined hull 10 of substantially circular cross-section throughout its length and of a length substantially equal to the span between the ends of the wings 11 and 12. The wings 11 and 12 afford an aerofoil surface only sufficient to support the craft during horizontal flight at normal or high speeds and they are accordingly of dimensions less than those normally provided in aircraft, that is to say, the wings are such as to operate at an incidence substantially corresponding to the minimum resistance or maximum L/D ratio. The wings are carried by a girder member 13 extending transversely of the craft and horizontally braced by the members 14. The wings carry a pair of rotors 15 and 16 which are shown in Figure 1 in position for forward horizontal flight of the craft with the rotors 15 and 16 carried in front of the leading edges of the wings 11 and 12. The rotor blades may have a similar shape to that of airscrew blades i. e., helicoidal, but the size of blade to be employed is discussed hereinafter. The rotors or airscrews 15 and 16 are driven by means of shafts 17 and 18 which are carried in bearings 19 and 20 secured to the girder 13 and which are driven in common from the shaft 21 coupled to the engine 22 carried in the forward part of the hull 10. If found desirable or necessary the engine 22 may be provided with a fan 23 for cooling the engine, an airstream produced by the fan passing into the engine housing through the slots 24 at the forward part of the hull 10. Bevel gears may be provided in a suitable housing 25 to provide an operative connection between the shaft 21 and the driving shafts 17 and 18 and the drive from the shafts 17 to the rotor 15 which is similar to that from the shaft 18 to the rotor 16 will be seen more clearly from Figures 2 and 3.

As will be seen from the figures last referred to the shaft 17 is connected through the coupling 26 to a shaft 27 on which is keyed a bevel gear 28 for transmitting a drive to an intermeshing gear 29 splined to a shaft 30 at the end of which the rotor 15 is carried. The shaft 30 is mounted in bearings carried at the forward part 31 and on the inner flange 32 towards the rear part of a housing 33. The housing 33 is carried on trunnions afforded in the webs 34 and 35 secured to the girder 13, the said trunnions being co-axial with the shaft 27, between which and the housing 33 at the said trunnions are located antifriction bearings, one of which is seen at 136. It will be appreciated, therefore, that a drive to the rotor 15 from the shaft 17 can take place whilst the rotor itself carried by the housing 33 may be adjusted bodily about the axis of the shaft 17, the housing 33 being moved pivotally in the trunnions afforded by the webs 34 and 35. Such movement of the housing 33 will correspond to a movement thereof (and of the rotor 15 carried thereby) from the position shown in full lines in Figure 2 to the position shown in chain lines in that figure. Such adjustment of the housing 33 is conveniently effected by means of one or more extensible devices such as hydraulic rams the outer cylinders of which are represented at 36 and 37 as being pivotally secured to the bracket 38 carried by the girder 13. The hydraulic rams have pistons 39 pivotally connected at 40 to lugs provided at the forward end of the housing 33, a pair of hydraulic rams being provided in association with the housing for each rotor. The hydraulic rams are conveniently of a double-acting nature, inlets and outlets 41 being provided at each end of the cylinders 36 and 37 for the ingress or egress of hydraulic liquid under the action of a hand or power operated pump when it is desired to adjust the position of the rotor. It will be noted that the hydraulic rams serve to lock the rotor in any position of adjustment by rigidly fixing the length of the coupling represented by the piston and cylinder of the ram.

The rotors 15 and 16 may include any known type of mechanism for varying the pitch of the blades of the rotors and such mechanism is preferably controlled by the actuation of a crank 42 which together with the rod 43 constitutes a pivotally interconnected linkage between the variable pitch mechanism for the rotor and a fixed point of the aircraft such as the pivotal connection 44 at one end of the rod 43 with the flange 35. The linkage 42 and 43 is such as to ensure an automatic adjustment of the pitch of the blades of the rotor with the bodily adjustment of the rotor from the horizontal to the vertical position represented in Figure 2 in full and chain lines respectively. It will be noted that at an intermediate position of the rotor 15, as shown at 45, the rod 43 will maintain the link 42 at a position intermediate the extreme positions between which it moves and will ensure the pitch angles of the blades of the rotor having an adjustment intermediate that desirable at its extreme positions. The extreme positions of the blade 46 of the rotor and of the link 42 controlling the pitch of the blade 46 are shown at the three different positions of the rotor 15 indicated in Figure 2.

Details of the mechanism for varying the pitch of the blades of the rotors are shown in Figure 6. The blade roots 15 carry quadrants 15a having bevel teeth which mesh with a bevel wheel 15b in the hub of the rotor. The bevel wheel has a sleeve 15c which is journalled in the hub and contains an inclined cam slot 15d. The link 43 and arm 42 operate an internal bellcrank arm 42a within the housing 33 and this causes a sleeve 42b to slide along the outside of the shaft 30. The sleeve engages a crosshead 42c within the shaft and the crosshead has a shank 42d which extends into the sleeve 15c and carries a pin 42e which works in the cam slot 15d. Thus, operation of the linkage will rotate the bevel wheel 15b and thereby rotate the rotor blades.

It is intended that an aircraft of the form which has been described shall take off with the rotors in position to rotate in a more or less horizontal or only slightly inclined plane with the pitch angles of the rotor blades relatively small. Since the rotors are driven at all positions of bodily adjustment the plane will take off in the manner of a helicopter due to the drive of the substantially horizontal rotors. It is probable that the craft will be found best to climb at a position of adjustment of the rotors intermediate their extreme positions due to the effect of the fixed aerofoil surface of the wings 11 and 12, by giving the machine a tendency for forward as well as vertical motion. The rotors provided must have a disc area sufficiently large for the required lift to be obtained, the disc loading being determined by the ratio of the weight of the craft to the horse power available for driving the rotors when in position for ascent of the craft. A reduction gear coupled between the engine for the craft and the rotors will permit rotors of sufficiently large diameter to be used. One or more auxiliary high speed airscrews having a substantially horizontal axis of rotation may also be used if found desirable. It may, however, be found more economical to provide only sufficient engine power to support the machine during horizontal flight and to obtain the initial take-off and climb by arranging the pitch angle of the rotor blades at zero when located in a horizontal plane in order to allow the engine of the craft to race and store up energy in the rotor. In order to take off the rotor would be moved forward from such a position at which it had been raced and, owing to the increased pitch of the rotor, it would utilise the stored up energy to provide the additional power required for the take-off.

As it is intended that the craft will be more or less supported by the rotors 15 and 16 when taking off, the axis of the shafts 17 and 18 about which the rotors are subject to bodily adjustment are conveniently located at a position considered only longitudinally of the craft similar to that at which the centre of gravity of the craft is located and similarly also, therefore, to the position of the centres of pressures of the wings 11 and 12. Such an arrangement tends to avoid the craft assuming an attitude depending upon the position of bodily adjustment of the rotors 15 and 16, although it is to be noted that a small change in the attitude of the craft as a whole may be of some advantage when the craft is climbing. The use of a pair of rotors as shown in the drawings will serve to prevent the craft turning bodily when climbing if, as suggested in the arrangement of the drive of the propellers shown in the drawings, the rotors 15 and 16 are driven in opposed directions. These directions are conveniently such as to be opposed to the direction of rotation of the vortices occurring in the wake of the wings 11 and 12 during forward horizontal flight. That is to say, the starboard rotor (15) is driven in a clockwise direction and the port rotor (16) is driven in a counterclockwise direction when viewed and considered from the rear or tail of the craft, it being assumed that the rotors have been gradually moved by actuation of the hydraulic rams after ascent of the craft into positions in front of the wings.

From the foregoing it will readily be understood that considerable changes of rotational speeds may be necessary when the rotors are adjusted from rotation in a horizontal plane to rotation in a vertical plane since rotors for lifting the craft will be of larger diameter than is necessary for the available engine power when used for producing forward movement. To overcome these difficulties various measures may be adopted. Conveniently, a two or more change speed gear 47 may be included in the drive from the motor 22 to the rotors 15 and 16 to allow the latter, when in a vertical plane, to rotate at a reduced speed. The internal construction of the speed gear 47 is shown in Figure 5 as comprising a sun and planet mechanism the sun wheel of which is driven by the engine 22 and the planet wheels of which mesh with an internally toothed gear member 47a. This gear member is provided with a friction surface to engage the interior of the outer member 47 of the gear if the latter is moved endwise along the shaft 49. When the members 47 and 47a are brought into engagement the gear wheels rotate as one solid whole without any reduction of speed. The planet wheels are carried on the shaft 49 and if the member 47 is drawn back from engagement with the internal gear member 47a the shaft 49 will be driven at a reduced speed, the member 47a being held from rotation by the engagement of ratchet teeth 47b with pawls 47c. This gives a low speed drive. Alternatively, by effecting horizontal flight of the craft at high altitudes, the reduced air density enables the large diameter rotors to operate without reduction in rotational speed. Small-torque rotors having a reduced blade area and/or incidence can however be utilized in the craft for normal horizontal flight but must be rotated temporarily at an excessive speed when adjusted for rotation in a substantially horizontal plane for the purpose of securing a take-off of the craft as described above.

A free wheel device 48 is conveniently also included in the drive from the motor 22 to the rotors 15 and 16 so that the latter may rotate under air pressure alone without the motor 22 being operative. The internal construction of the free wheel 48 is indicated diagrammatically in Figure 4 as comprising pawls carried on the driven shaft and engaging with ratchet teeth on the interior of the casing which constitutes the driving member of the free wheel. In this connection it is pointed out that with the disposition and drive of the rotors 15 and 16 which has been described they will, subject to a suitable adjustment of the pitch of the rotor blades, be subject to autorotation when the drive from the motor 22 is discontinued. The linkage 42 and 43 controlling the pitch of the rotor blades is therefore preferably such as to ensure that the pitch angle of the rotors for all positions of bodily adjustment thereof is such as to ensure that autorotation may take place at any of the said positions. Such autorotation of the rotors 15 and 16 will normally be employed during landing, the rotors 15 and 16 being gradually moved from their forward to their vertical position as the speed of the craft is reduced in order to support the craft at the reduced speed, it being always possible, however, to drive the rotors from the engine of the craft. The rotor blades may be articulated at their root, as on existing gyroplanes, in order to equalise loads and reduce stresses in the craft during autorotation of the rotors.

Manoeuvring of the craft during flight may be effected, by means of ailerons, elevators and rudder normally provided in aircraft and indicated in the drawings, or alternatively or in addition thereto, by controlling to different extents the inclinations of the bodily adjustment of the rotors, the pitch angle of the blades of the rotors or the speeds of the rotors. If an undercarriage for the craft is provided it may be convenient to provide one of a retractible nature with the retracting mechanism so connected to the mechanism securing operation of the hydraulic rams moving the rotors from the vertical to a horizontal position that the latter adjustment of the rotors is automatically accompanied by a retraction of the undercarriage. Similarly, adjustment of the rotors from the horizontal to the vertical position for landing will serve to bring the undercarriage again into position for use. The undercarriage can also be such as to afford the craft very little ground clearance since the rotors are above the craft when the undercarriage is in use.

I claim:

1. An aircraft comprising a fixed aerofoil surface to support the craft in horizontal flight at maximum speed, a pair of rotors which are disposed one on each side of the fore-and-aft plane of symmetry of the craft and are mounted for bodily adjustment relatively to the craft into alternative positions at which vertical lift and forward horizontal movement of the latter are aided by the rotors to a greater or less extent, and means to transmit an engine drive to the rotors at any one of said alternative positions, and which aircraft comprises also means connected between the rotors and a fixed part of the aircraft to effect adjustment of the pitch of the rotor blades simultaneously with the adjustment of the position of the rotors relatively to the craft.

2. An aircraft according to claim 1 in which each rotor is mounted for bodily adjustment of its axis of rotation in a plane substantially parallel to the fore-and-aft plane of symmetry of the craft about an axis transverse and substantially perpendicular to the said planes and between limiting positions of adjustments which have an angular separation of approximately one right angle whereby the rotor may be moved to produce vertical lift or forward horizontal movement of the craft alone respectively.

3. An aircraft according to claim 1 comprising a free-wheel device included in the means to transmit an engine drive to the rotors to permit autorotation of the latter to take place.

4. An aircraft according to claim 1 comprising a change-speed gear included in the means to transmit an engine drive to the rotors to enable the rotational speed of the latter to be adjusted upon bodily adjustment of their position relatively to the craft.

5. An aircraft according to claim 1 in which the rotors have blades which are articulated at their roots to permit a movement of the blades effecting adjustment of the stresses thereon during autorotation.

6. An aircraft comprising wings extending transversely of the craft to support the latter in horizontal flight at maximum speed, a framework pivotally mounted on each wing for bodily adjustment relatively thereto between alternative positions at which the framework extends respectively substantially perpendicular to and substantially in line with the wing section, a pair of rotors which are disposed one on each side of the fore-and-aft plane of symmetry of the craft and which are mounted at that end of each framework remote from its pivotal mounting for bodily adjustment with the framework, means to transmit an engine drive to the rotors at any position of bodily adjustment of each framework, and means connected between the rotors and a fixed part of the aircraft to effect adjustment of the pitch of the rotor blades simultaneously with the bodily adjustment of the position of the rotors relatively to the craft.

7. An aircraft according to claim 6 in which the wings have a loading and operate at an incidence in horizontal flight at maximum speed substantially corresponding to the minimum resistance or maximum value of the L/D ratio.

8. An aircraft according to claim 6 including means for mounting each framework and rotor carried thereby for bodily adjustment between positions at which the rotors turn respectively in substantially horizontal planes above the wings and in substantially vertical planes in front of the leading edges of the wings, and wherein the means to transmit an engine drive to the rotors also effects rotation thereof in directions opposite to that of the vortices formed in the wake of the wings i. e., clockwise rotation of the starboard rotor and counter-clockwise rotation of the port rotor considered from the rear of the craft.

9. An aircraft according to claim 6 in which the means to transmit an engine drive to the rotors comprises a rotor shaft carrying the rotor and mounted for rotation in each framework to extend longitudinally of the latter, driving shafts for the rotors carried by the wings and extending transversely of the craft co-axially with the pivotal mounting of each framework, and interengaging bevel gears on the said driving and rotor shafts.

10. An aircraft according to claim 6 in which the means to transmit an engine drive to the rotors comprises a rotor shaft carrying the rotor and mounted for rotation in each framework to extend longitudinally of the latter, driving shafts for the rotors carried by the wings and extending transversely of the craft co-axially with the pivotal mounting of each framework, interengaging bevel gears on the said driving and rotor shaft, and an engine mounted in the hull of the craft connected in common to the driving shafts for both rotors.

11. An aircraft according to claim 6 comprising for each rotor a linkage pivotally interconnected between a fixed part of the craft affording the pivotal mounting for the rotor carrying framework and a mechanism to vary the pitch of the rotor blades.

12. An aircraft according to claim 6 in which the pivotal mountings of each framework are located in a position, considered only longitudinally of the craft, similar to that of both the approximate centre of gravity of the craft and the approximate centre or centres of pressure of the wings.

13. An aircraft according to claim 6 comprising an extensible and contractible device pivotally interconnected between a fixed part of the craft and each adjustable framework for effecting adjustment of the position of the latter relatively to the craft, and means to lock the device in one of a number of positions of extension.

14. An aircraft comprising wings extending transversely of the craft to support the latter in horizontal flight at maximum speed, a framework pivotally mounted on each wing for bodily adjustment relatively thereto between alternative positions at which the framework extends respectively substantially perpendicular to and substantially in line with the wing section, a double acting hydraulically operable extensible piston and cylinder device which can be maintained in any desired position of extension and which is pivotally interconnected between a fixed part of the craft and each adjustable framework for the purpose of effecting said bodily adjustment, a pair of rotors which are disposed one on each side of the fore-and-aft plane of symmetry of the craft and which are mounted at that end of each framework remote from its pivotal mounting for bodily adjustment with the framework, means to transmit an engine drive to the rotors at any position of bodily adjustment of each framework, and means connected to effect adjustment of the pitch of the rotor blades simultaneously with the bodily adjustment of the position of the rotors relatively to the craft.

15. An aircraft comprising a fixed aerofoil surface to support the craft in horizontal flight at maximum speed, a pair of rotors which are disposed one on each side of the fore-and-aft plane of symmetry of the craft and are mounted for bodily adjustment relatively to the craft into alternative positions at which vertical lift and forward horizontal movement of the latter are aided by the rotors to a greater or less extent, and means to transmit an engine drive to the rotors at any one of said alternative positions, and which aircraft comprises also for each rotor a linkage pivotally interconnected between a fixed part of the craft and a mechanism to vary the pitch of the rotor blades whereby variation of the pitch of the rotor blades is automatically effected upon bodily adjustment of the position of the rotors relatively to the craft.

16. An aircraft comprising wings extending transversely of the craft to support the latter in horizontal flight at maximum speed, a framework pivotally mounted on each wing for bodily adjustment relatively thereto between alternative positions at which the framework extends respectively substantially perpendicular to and substantially in line with the wing section, a pair of rotors which are disposed one on each side of the fore-and-aft plane of symmetry of the craft and which are mounted at that end of each framework remote from its pivotal mounting for bodily adjustment with the framework, means to transmit an engine drive to the rotors at any position of bodily adjustment of each framework and for each rotor a linkage pivotally interconnected between a fixed part of the craft and a mechanism to vary the pitch of the rotor blades whereby variation of the pitch of the rotor blades is automatically effected upon bodily adjustment of the position of the rotors relatively to the craft.

LESLIE EVERETT BAYNES.